Patented Apr. 7, 1925.

1,532,640

UNITED STATES PATENT OFFICE.

OSKAR SPENGLER AND ALFRED THURM, OF DESSAU, ANHALT, GERMANY, ASSIGNORS TO ACTIEN GESELLSCHAFT FÜR ANILIN FABRIKATION, OF BERLIN, GERMANY.

SULPHUR DYES.

No Drawing.    Application filed August 2, 1924. Serial No. 729,841.

*To all whom it may concern:*

Be it known that we, OSKAR SPENGLER and ALFRED THURM, citizens of the German Republic, residing at Dessau, in Anhalt, Germany, have invented certain new and useful Improvements in Sulphur Dyes, of which the following is a specification.

By sulfurizing oxyazines and allied bodies red to violet sulphur dyestuffs are obtained. Most of these dyes are sensitive to acid and in particular are not sufficiently fast to a soap boil and a souring boil.

According to this invention dyes containing sulphur and capable of dyeing cotton when dissolved with aid of an alkaline reducing agent, such as an alkali metal sulfide, which may be replaced by an alkali and an alkali metal hydrosulfide, may be obtained by treating with a sulphur halide a compound produced from a para-diazine having as members an 8-sulfo-1.2-naphthalene ring and another ring system preferably also an 8-sulfo-1.2-naphthalene ring by alkali fusion. Instead of sulphur halide a material adapted to form sulphur halide may be employed.

The dyes may be manufactured in presence of a catalyst. According to the prevailing conditions, such as the temperature, solvent, catalyst, the dyes produced present different properties, namely in respect of variation of colour tint and insolubility in sodium sulfide. In the dry pulverized state the dyes are dark powders soluble in alkali metal sulfide solution with a blue to green colour and, when reduced, dye cotton from an alkaline vat tints which after oxidation are generally speaking, reddish.

The following examples illustrate without limiting the invention in what manner the dyes may be manufactured, the parts being by weight:

1. The compound obtained by fusion of 1.2.1′.2′-dinaphthazine-8.8′-disulfonic acid

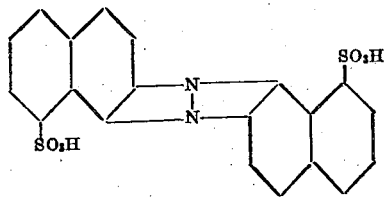

with potassium hydroxide is heated with 10 times its weight of sulphur monochloride for half an hour at 80° C.; after cooling the thick magma is drained and washed once with benzene. The dye dissolves to a blue solution in sodium sulfide solution, in which cotton is dyed a blue, which after exposure to air or treatment with another oxidizing agent becomes an orange surprisingly fast to soap boil and souring boil.

2. The parent material used in example 1 is suspended in 10 times its weight of nitrobenzene and the mixture is heated with sulphur monochloride amounting to three times the weight of the parent material at 115° C. for 3 hours. After cooling the fine grained dye is drained and washed with benzene. The dye dissolves in sodium sulfide solution to a blue solution which dyes cotton blue, passing to a brownish red on exposure to air, or more quickly when treated with potassium bichromate. Hydrogen peroxide yields a clear yellow red characterized by its fastness to soap boil and souring boil.

3. The procedure is as described in example 1 but for each part of azine there is added 0.1 part of sublimed aluminium chloride. A greenish blue solution of the dye in sodium sulfide solution produces on cotton a clear Bordeaux tint which is developed by hydrogen peroxide to red.

4. 1 part of the parent material used in the preceding examples is suspended in 10 parts of nitrobenzene, some cuprous bromide and iodine are added and the whole is heated gradually with 5 parts of sulphur monochloride at 140° C. The dye which separates is drained and washed with benzene. It dissolves in sodium sulfide solution to a greenish blue solution and has dyeing properties similar to those described in example 3. The residue dissolves in alkali metal hydrosulfide solution to a brownish yellow solution which dyes at a comparatively low temperature tints which can be developed by chlorine water.

5. 1 part of the compound obtained by alkali fusion of 1.2.1′.2′-dinaphthazine -8.8′- disulfonic acid is suspended in 10 parts of nitrobenzene together with 0.01 part of cuprous iodide, and there is run in, whilst stirring, a mixture of 4 parts of sulphur dichloride with the same quantity of nitrobenzene. The mixture is heated to 85–90°

C. and this temperature is maintained for some time. The drained and washed dye dissolves in concentrated sulfuric acid to a corn-flower blue solution. Its hydrosulfite vat dyes cotton copper color which can be oxidized by means of chlorine water to an orange.

6. The compound obtained by alkali fusion of 8-sulfo-1.2-naphthophenazine is heated in nitrobenzene in presence of cuprous iodide with 4 times its weight of sulphur monochloride, whilst stirring, the temperature being gradually raised to 115° C. The dye dissolves in sodium sulfide solution to a blue solution and dyes cotton reddish brown.

7. 1 part of the compound obtained by alkali fusion of 8-sulfo-1.2-naphtho-3'-aminophenazine is stirred in nitrobenzene, to which 0.2 parts of cuprous iodide and 4 parts of sulphur monochloride have been added, for one day at ordinary temperature. A portion of the product which is soluble in sodium sulfide dyes cotton reddish brown, while the residue dyes cotton more blackish in the brown yellow vat which it yields with alkali hydrosulfide.

What we claim is,—

1. The dyes containing sulphur being in the pulverized dry state dark powders soluble in alkali metal sulfide solution with a blue to green color and, when reduced, dyeing cotton from an alkaline vat tints which after oxidation are, generally speaking, reddish; these new dyes being obtained by treating with a sulphur halide the compound obtained by alkali fusion from a para-diazine having as members an 8-sulfo-1.2-naphthalene ring and another ring system.

2. The dyes containing sulphur being in the pulverized dry state dark powders soluble in alkali metal sulfide solution with a blue color and, when reduced, dyeing cotton from an alkaline vat deep red after oxidation; the dyes being obtained by treating with a sulphur halide the compound obtained by alkali fusion of a para-diazine having as members two 8-sulfo-1.2-naphthalene rings.

3. The dye containing sulphur being in the pulverized dry state a dark powder soluble in alkali metal sulfide solution with a blue color and dyeing when reduced cotton from an alkaline vat deep red after oxidation; the dye being obtained by treating with a sulphur halide the compound formed by alkali fusion from 1.2.1'.2'-dinaphthazine-8.8'-disulfonic acid.

In testimony whereof we affix our signatures in presence of two witnesses.

OSKAR SPENGLER.
ALFRED THURM.

Witnesses:
  RUDOLPH FRICKE,
  WILLY STIER.